US007302437B2

(12) United States Patent
Cho et al.

(10) Patent No.: US 7,302,437 B2
(45) Date of Patent: Nov. 27, 2007

(54) METHODS, SYSTEMS, AND COMPUTER-READABLE MEDIA FOR A GLOBAL VIDEO FORMAT SCHEMA DEFINING METADATA RELATING TO VIDEO MEDIA

(75) Inventors: Wei Wei A. Cho, Issaquah, WA (US); Saar Picker, Bellevue, WA (US); Stephen R. Husak, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 470 days.

(21) Appl. No.: 11/021,229

(22) Filed: Dec. 23, 2004

(65) Prior Publication Data

US 2006/0143191 A1 Jun. 29, 2006

(51) Int. Cl.
*G06F 17/30* (2006.01)
(52) U.S. Cl. .................................... 707/100
(58) Field of Classification Search ............. 707/3, 707/4, 100; 709/235; 370/230
See application file for complete search history.

(56) References Cited

U.S. PATENT DOCUMENTS 6,523,022 B1 * 2/2003 Hobbs ........................ 707/3
6,564,263 B1   5/2003 Bergman et al.
2004/0120698 A1   6/2004 Hunter

OTHER PUBLICATIONS

Internet Personal Live Video Streaming Station Using a Sclable Video Distribution Technique: Hiroshi Jinzenji, Hisayasu Takada and Hisashi Kasahara.*
Real Time Audio and Video Transmission of IEEE GLOBECOM'96 over the Internet: Colin Perkins and Jon Crowcroft.*
Bray, Tim, *RDF and Metadata*, Oreilly Media, Inc., http://www.xlm.com/pub/a/98/06/rdf.html, Jun. 9, 1998, 6 pp.
Westermann, Utz, et al., *An Analysis of XML Database Solutions for the Management of MPEG-7 Media Descriptions*, ACM Computing Surveys, Dec. 2003, pp. 331-373, vol. 35, No. 4, New York, New York, United States.

* cited by examiner

*Primary Examiner*—Etienne Leroux
(74) *Attorney, Agent, or Firm*—Senniger Powers

(57) ABSTRACT

Generating data, such as metadata, relating to video media, such as a movie, and formatted according to a global video format. When metadata that is associated with video media and is formatted according to a formatting scheme associated with a particular content provider is received, the formatting scheme of the received metadata is validated if the formatting scheme of the received metadata corresponds to the global video format. Such video media may include streaming video, Video-On-Demand (VOD) movies, Pay-per-view movies, downloadable movies, and video files adapted for rendering by a media player program executed on a computer.

20 Claims, 3 Drawing Sheets

METHODS, SYSTEMS, AND COMPUTER-READABLE MEDIA FOR A GLOBAL VIDEO FORMAT SCHEMA DEFINING METADATA RELATING TO VIDEO MEDIA

TECHNICAL FIELD

Embodiments of the present invention relate to the field of providing metadata associated with video media. In particular, embodiments of this invention relate to methods, systems, and computer-readable media capable of generating video media metadata formatted according to a global video format schema.

BACKGROUND OF THE INVENTION

With the advancement of conventional video technologies, a growing number of Independent Content Providers (ICPs) provide video media to consumers (e.g., MOVIELINK® of Santa Monica, Calif. and CINEMA NOW® of Santa Monica, Calif.). These video technologies include, for example, Video-On-Demand (VOD) movies, Pay-per-view movies, and downloadable movies, to name a few. Each video media has video metadata associated with it that describes the video content. More generally, metadata is defined as data about data, and metadata commonly describes aspects of a tangible thing, such as a movie, an audio compact disc (CD), a digital video disc (DVD), a theatrical performance, or a concert, to name a few. In the case of video media, typical metadata includes several pieces of information, such as movie title, movie year, and movie rating, among others. The video metadata is very useful, not only because it describes the content of the video media, but also because it provides a basis for combining both video media and metadata associated with the video media from several providers.

Unfortunately, each individual ICP uses its own proprietary video metadata format, and often the formats of different ICPs are incompatible with each other. Because the format of the metadata from each provider is different, integrating metadata from multiple providers has proven difficult. Although transfer of some metadata pertaining to each video media from different providers is possible, recognizing and providing the majority of the metadata for consumption by an end user client is difficult, as the different formatting of various providers makes integration from various sources difficult. Moreover, such techniques ultimately fail to utilize the metadata effectively if they are unable to provide the majority of relevant metadata to the client.

Conventional techniques provide only limited amounts and types of metadata and provide no guidance to content providers regarding a common formatting scheme for use with video media metadata. Accordingly, a solution that enables metadata to be validated as conforming to a global video format schema or converted to a global video format schema so that the metadata may be readily organized for consumption by clients is desired.

SUMMARY OF THE INVENTION

Accordingly, a method (or a computer-readable media or a system) of generating data relating to video media formatted according to a global video format schema—the method comprising defining a global video format schema; receiving metadata associated with video media formatted according to a formatting scheme associated with a content provider; and validating the received metadata if the formatting scheme of the received metadata corresponds to the global video format schema—is desired to address one or more of these and other disadvantages. For example, embodiments of the invention may be well-suited for providing metadata associated with video media from a variety of providers, generally as set forth above, without regard to the platforms and technologies used by the different providers. Advantageously, aspects of the present invention permit self validation to ensure consistency, completeness, and validity of metadata. Moreover, in at least one embodiment, the invention defines attributes for matching metadata to video content from ICPs. Embodiments of the invention also provide an automated flow of video metadata across different systems or providers.

In accordance with one aspect of the invention, a method of generating data formatted according to a global video format schema and relating to video media, comprises defining a global video format schema. The method further comprises receiving metadata from a content provider. The metadata is associated with video media and includes information relating to content of the video media. The received metadata is formatted according to a formatting scheme associated with the content provider. The method also validates the received metadata if the formatting scheme of the received metadata corresponds to the global video format.

In accordance with another aspect of the present invention, a system for validating the format of metadata relating to video media comprises a processor configured for receiving metadata from a content provider. The metadata is associated with video media and includes information relating to content of the video media. The received metadata is formatted according to a formatting scheme associated with the content provider. The system also comprises a memory area for storing a global video format schema for organizing metadata relating to video media. The processor is configured to execute computer-executable instructions to validate the formatting scheme of the received metadata if the formatting scheme corresponds to the global video format.

In accordance with still another aspect of the present invention, a computer-readable medium having stored thereon a data structure for generating metadata according to a global video format schema is disclosed. The metadata relates to content of video media, and the data structure has a plurality of pre-defined attributes. The attributes includes a video media type attribute storing a value identifying video media rating information, a video media creation attribute storing a value identifying video media release date information, a video media title attribute storing a value identifying video media title information, and a video media duration attribute storing a value identifying video media run length information. The video media type, creation, title, and duration attributes define a global video format schema having a particular format for standardizing video media metadata organization of metadata received from a plurality of content providers.

Alternatively, the invention may comprise various other methods, systems, computer-readable media, and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Embodiment of the invention permit generating data relating to video media formatted according to a Global Video Format (GVF), or schema. Using such a GVF provides the several benefits described here, among others. First, utilizing a common format to describe video media metadata allows for ready integration of data irrespective of the platforms and technologies used by different providers. Second, the GVF provides a self-validating mechanism to ensure consistency, completeness, and validity of video media metadata. Third, the GVF allows key attributes of the metadata to be defined for use in matching against video media content from providers, while maintaining the ability of the system to identify the source of the video media via a link identified with the video media. Fourth, the GVF provides relative ease in automation of the video metadata across different systems or providers. Fifth, the GVF allows for turnkey activation of additional providers without further modifications. Sixth, the GVF-formatted metadata relating to a video media may function as an identifier of the video media. The GVF will be described in greater detail below, and a more detailed, full-length example of such a GVF is included in Appendix A. This exemplary GVF is not meant to be limiting, but is included for illustrative purposes.

As used herein, video media may comprise video of any format, including, streaming video, Video-On-Demand (VOD) movies, Pay-per-view movies, and downloadable movies and video files, among others. In addition, the data relating to the video media comprises metadata relating to the video media, as will be discussed in detail below. The video media discussed herein are adapted for rendering by a media player program executed on one or more client computers 130, such as those depicted in FIGS. 1 and 3. The video media discussed herein are also adapted for running on a remote computer and communicated between a media player and a network service, such as to update the metadata of media files managed by the media player.

Figure 1:
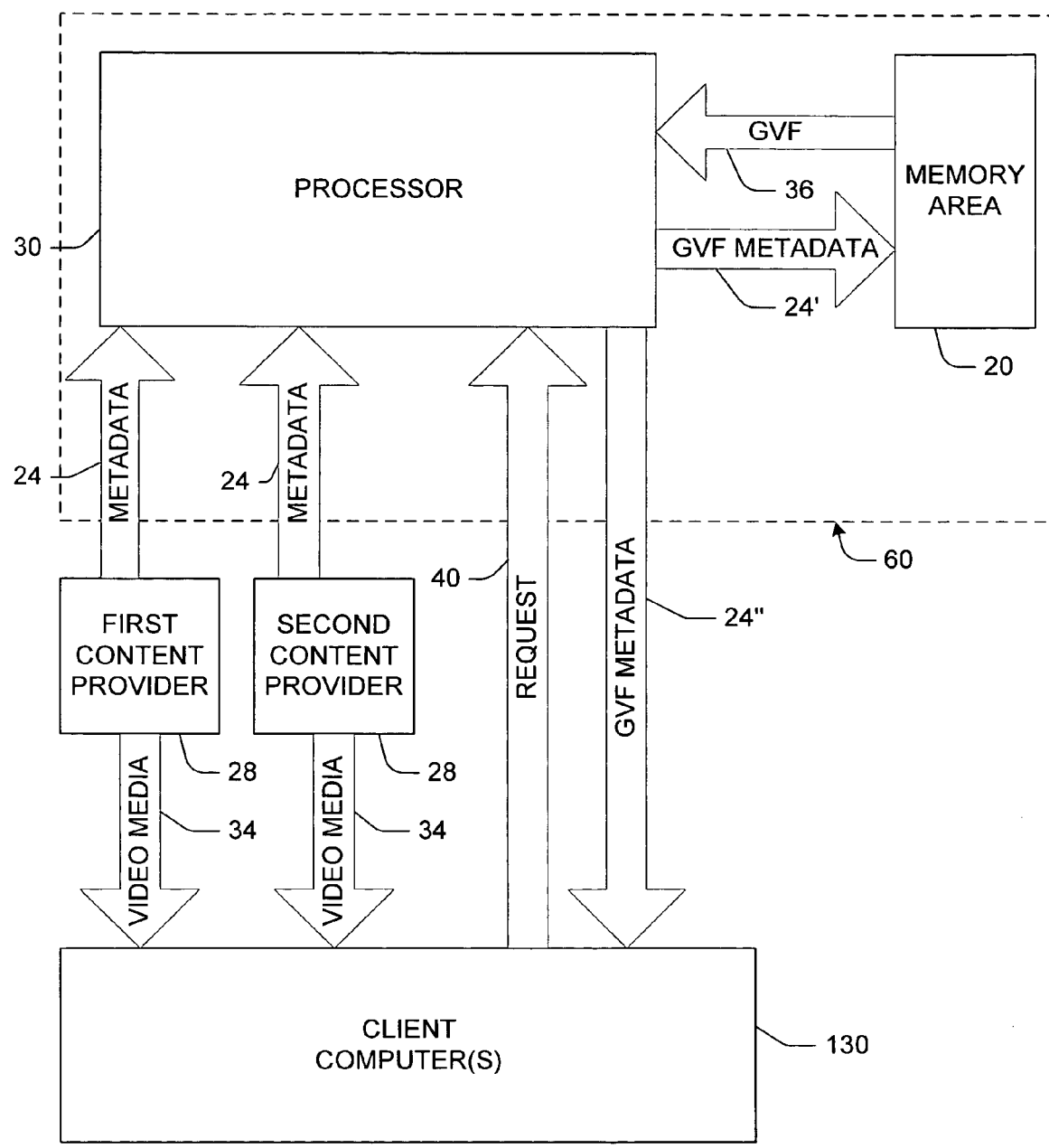
FIG. 1 is a diagram of a system according to one embodiment of the present invention.
Figure 3:
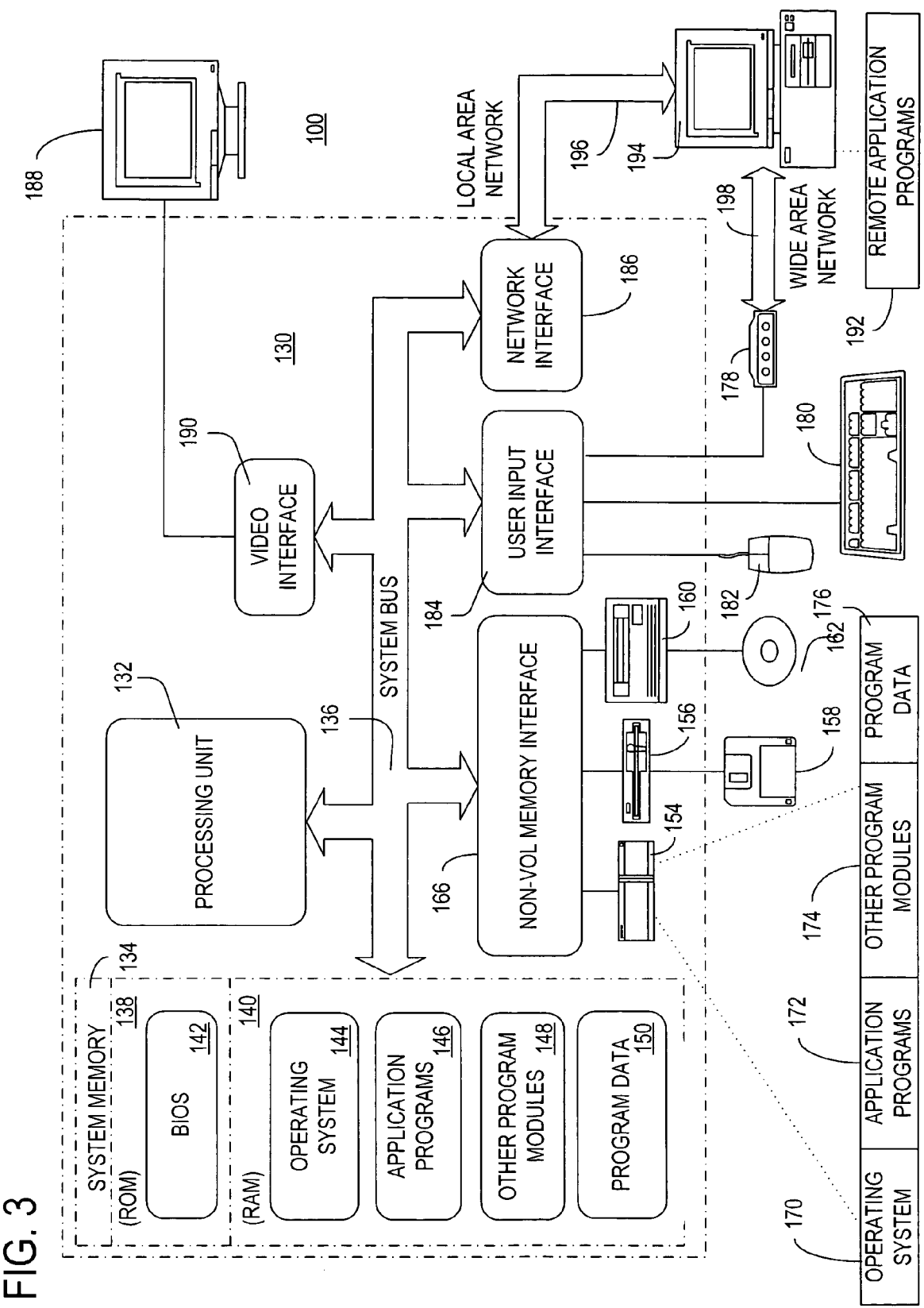
FIG. 3 is a block diagram illustrating one example of a suitable computing system environment in which the invention may be implemented.

Referring now to FIG. 1, a memory area 20, such as the hard disk drive 154 discussed below and depicted in FIG. 3, provides a data store for storing the global video format schema as introduced above. Metadata, as indicated by arrow 24, is received from a content provider 28, which may be one of many (two content providers are depicted in FIG. 1), through a processor 30. The metadata 24 is associated with video media, as indicated by arrow 34, both of which may ultimately be provided to a client computer 130. The metadata 24 includes information relating to the content of the video media 34. The metadata 24 received from the content provider 28 is formatted according to a formatting scheme associated with the content provider that may or may not correspond to the GVF. Such formatting schemes may differ greatly from one content provider 28 to another, such that the metadata 24 provided by each content provider is not easily integrated.

In an effort to determine the organization of the formatting scheme of the content provider 28, one embodiment of the invention validates the formatting scheme of the received metadata 24 if the formatting scheme of the received metadata 24 corresponds to the GVF. This validated metadata 24 may then be seamlessly integrated with other metadata also formatted according to the GVF and forwarded to the client computer 130 for consumption by the client. A detailed, full-length example of a video media metadata that complies with the exemplary GVF of Appendix A is included in Appendix B. This exemplary video media metadata is not meant to be limiting, but is included for illustrative purposes.

In the event that the formatting scheme of the received metadata 24 does not correspond to the GVF, aspects of the invention convert the format of, or reformats, the received metadata from the formatting scheme of the content provider 28 to the GVF. In one particular embodiment, converting comprises separating the received metadata 24 into attributes (i.e., data categories) and formatting the attributes of the received metadata according to attributes of the GVF. Exemplary attributes include title, release date, rating, among any number of others. In one example, formatting may further comprise reordering the attributes of the received metadata 24 according to the attributes of the GVF. In another example, formatting may additionally comprise matching the attributes of the received metadata 24 to the attributes of the GVF. In still another example, formatting may comprise altering the format of at least one of the attributes of the received metadata 24 (e.g., removing metadata relating to a release date of a video media 34 include with the title attribute metadata or selecting particular data portions of a release date attribute). It should be understood that one or more of these formatting operations may be undertaken in a single formatting operation, without departing from the scope of the claimed invention. It should also be understood that other formatting operations not specifically described here, such as interlinking video media from different sources having similar attributes, are also contemplated as within the scope of the claimed invention.

Once formatted according to the GVF, one embodiment of the invention stores the metadata, as indicated by arrow 24', formatted according to the GVF in the memory area 20. This includes validated metadata already formatted according to the GVF and received metadata converted from a different formatting scheme to the GVF. Once stored, the data store 20 (i.e., memory area) may be accessed and the metadata formatted according to the GVF may be retrieved, as indicated by arrow 36, from the data store for use in further operations.

Once the metadata is stored, embodiments of the invention additionally contemplate receiving a request, as indicated by arrow 40, for metadata 24 associated with the video media 34 and providing the metadata, which may include a link to a content provider 28 providing the particular video media, as indicated by arrow 24", formatted according to the GVF in response to the request. For example, such a request 40 may originate from the client computer 130. The request 40 for metadata 24 may take the form of a specific request for additional metadata or more generally as data associated with a more general video media request by the client computer 130.

Figure 2:
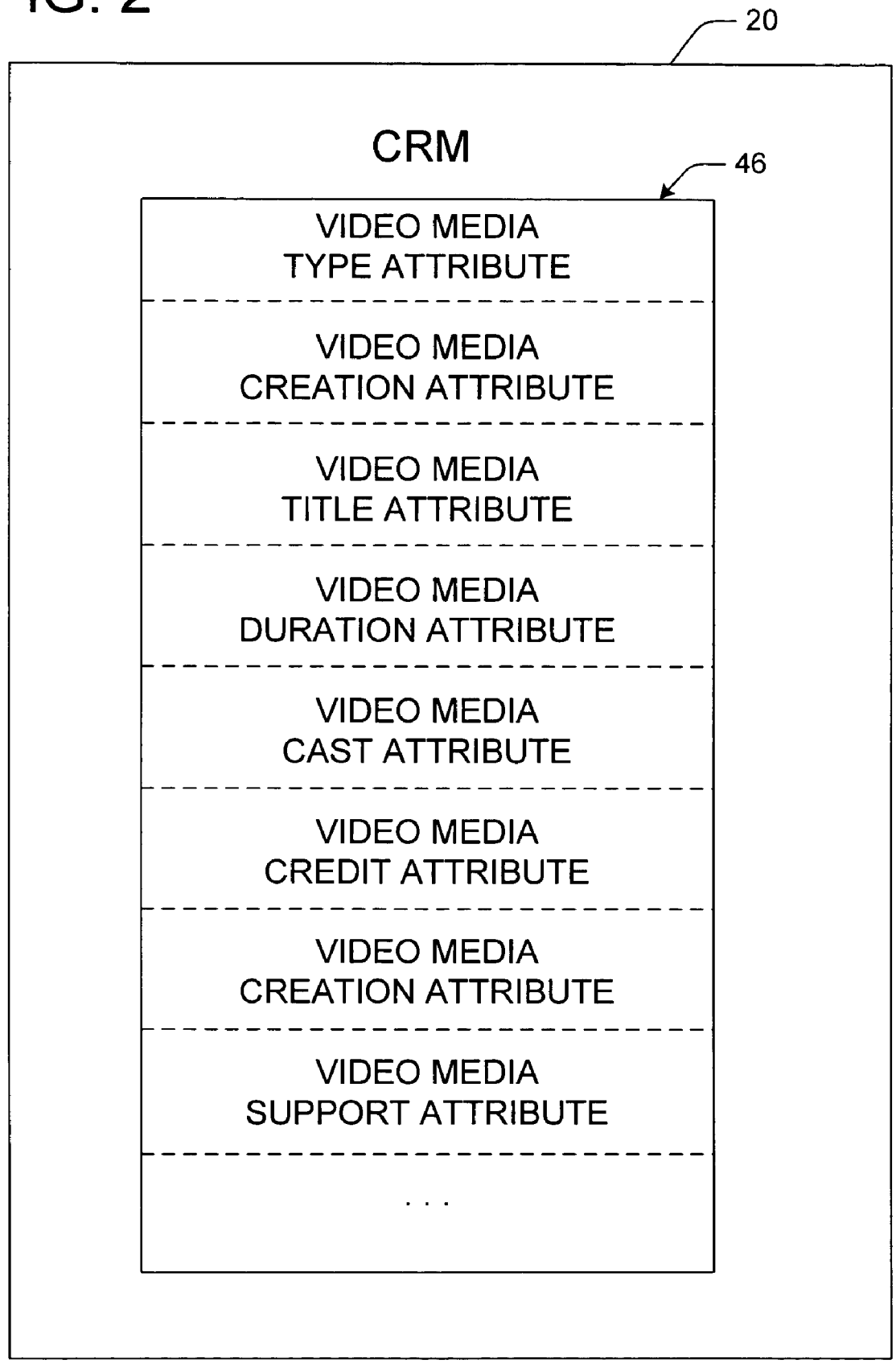
FIG. 2 is a diagram of a computer-readable media (CRM) according to one embodiment of the present invention.

In one example depicted in FIG. 2, the memory area 20 comprises a computer-readable medium (CRM), generally indicated 46, having stored thereon a data structure representing the GVF. The data structure comprises several attributes including: a video media type attribute storing a value identifying video media rating information, a video media creation attribute storing a value identifying video media release date information, a video media title attribute storing a value identifying video media title information, and a video media duration attribute storing a value identifying video media run length information. The video media type, creation, title, and duration attributes define a GVF having a particular format for standardizing video media metadata organization.

In another example, also depicted in FIG. 2, the computer-readable medium 46, having stored thereon a data structure representing the GVF, additionally comprises a video media cast attribute storing a value identifying video media actor information. In yet another example, the data structure further comprises a video media credit attribute storing a value identifying video media director information. In still another example, the data structure further comprises a video media creation attribute storing a value identifying video media writer information. In yet another example, the data structure further comprises a video media support attribute storing a value identifying video media producer information. Other potential metadata 24 include (i) video or movie reviews, (ii) references, or links, to similar videos, movies, books, magazines, websites, or other media, and (iii) filmography information, among others. The metadata 24 may comprise any information that may be helpful, interesting, or useful to the user of the client computer 130.

As would be readily understood by one skilled in the art, it is contemplated that one or more computer-readable media may have computer-executable instructions for performing one or more of the methods discussed above.

In another embodiment, also depicted in FIG. 1, a system, generally indicated 60, for validating the format of metadata 24 relating to video media 34 is disclosed. The system 60 comprises the processor 30 for receiving metadata 24 from content provider 28. As discussed above, the metadata 24 is associated with the video media 34 and includes information relating to, or complementary to, the content of the video media. The received metadata 24 is formatted according to a formatting scheme associated with the content provider 28, of which there may be several (e.g., first content provider and second content provider).

The system 60 also comprises the memory area 20 for storing the GVF schema, which may be used as a template for organizing metadata 24 relating to the video media 34. The memory area 20 comprises the computer-readable medium 46 having stored thereon the data structure representing the GVF schema (FIG. 2). The data structure comprises the video media type attribute storing a value identifying video media rating information, the video media creation attribute storing a value identifying video media release date information, the video media title attribute storing a value identifying video media title information, and the video media duration attribute storing a value identifying video media run length information. The video media type, creation, title, and duration attributes define a GVF having a particular format for standardizing video media metadata organization. The GVF may be further defined by at least one of the video media cast attribute storing a value identifying video media actor information, the video media credit attribute storing a value identifying video media director information, the video media creation attribute storing a value identifying video media writer information, and the video media support attribute storing a value identifying video media producer information, among others.

The processor 30 is further configured to execute computer-executable instructions to validate the formatting scheme of the received metadata 24 if the formatting scheme corresponds to the GVF. The processor 30 may be further configured to execute computer-executable instructions to convert the format of the received metadata 24 from the formatting scheme to the GVF if the formatting scheme of the received metadata does not correspond to the global video format. One skilled in the art would readily understand how to configure such a processor 30 to perform such operations consistent with the validations and conversions described in detail above.

As would be readily understood by one skilled in the art, the memory area 20 and the processor 30 of the previous examples discussed herein may comprise one or more memory areas or one or more processors, respectively, without departing from the scope of the claimed invention.

In another embodiment depicted in FIG. 2, the present invention may comprise one or more computer-readable media (CRM), generally indicated 46, having computer-executable components for generating metadata relating to content of video media according to the GVF. The data structure has a plurality of pre-defined attributes comprising the video media type attribute storing a value identifying video media rating information, the video media creation attribute storing a value identifying video media release date information, the video media title attribute storing a value identifying video media title information, and the video media duration attribute storing a value identifying video media run length information. The video media type, creation, title, and duration attributes define a GVF having a particular format for standardizing the organization of video media metadata received from a plurality of content providers 28. The computer-readable medium may further comprise at least one of the video media cast attribute storing a value identifying video actor information, the video media credit attribute storing a value identifying video director information, the video media creation attribute storing a value identifying video media writer information, and the video media support attribute storing a value identifying video media producer information, among others.

FIG. 3 shows one example of a general purpose computing device in the form of a computer 130. In one embodiment of the invention, a computer such as the computer 130 is suitable for use in the other figures illustrated and described herein. For example, processor 30 and/or memory area 20 may be embodied by computer 130. Computer 130 additionally has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 3 illustrates operating system 144, application programs 146, other program modules 148, and program data 150.

The computer 130 may also include other removable/non-removable, volatile/nonvolatile computer storage media. For example, FIG. 3 illustrates a hard disk drive 154 that reads from or writes to non-removable, nonvolatile magnetic media. FIG. 3 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 3, provide storage of computer readable instructions, data structures, program modules and other data for the computer 130. In FIG. 3, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, camera, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 3 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 3 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the operations described below in conjunction with a microprocessor or other data processor.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, computer 130 executes a method such as described above for generating data related to video media and formatted according to a global video format. The computer 130 (or its components) defines a global video format and receives metadata associated with video media from a content provider in a format corresponding to a formatting scheme associated with the content provider. The computer 130 validates the received metadata if the formatting scheme of the received metadata corresponds to the global video format.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A method of generating data relating to video media, said data formatted according to a global video format, said method comprising:
    defining a global video format;
    receiving metadata from a content provider, said metadata being associated with video media and including information describing content of said video media, said received metadata being formatted according to a formatting scheme associated with the content provider;
    determining whether the formatting scheme of the received metadata corresponds to the global video format; and
    validating the received metadata as a function of said determining.

2. The method as set forth in claim 1 farther comprising converting the format of the received metadata from the formatting scheme to the global video format if the formatting scheme of the received metadata does not correspond to the global video format.

3. The method as set forth in claim 2 wherein said converting comprises:
    separating the received metadata into attributes; and
    formatting said attributes of the received metadata according to attributes of the global video format.

4. The method as set forth in claim 3 wherein said formatting comprises at least one of reordering said attributes of the received metadata according to said attributes of the global video format, matching said attributes of the received metadata to said attributes of the global video format, and altering the format of at least one of said attributes of the received metadata.

5. The method as set forth in claim 3 further comprising storing said metadata formatted according to said global video format in a data store.

6. The method as set forth in claim 5 further comprising accessing said data store and retrieving said metadata formatted according to said global video format from said data store.

7. The method as set forth in claim 5 further comprising:
    receiving a request for metadata associated with the video media; and
    providing the metadata formatted according to said global video format in response to the request.

8. The method as set forth in claim 1 wherein said video media are adapted for rendering by a media player program executed on one or more client computers.

9. The method as set forth in claim 1 further comprising storing said metadata formatted according to the global video format in a memory area, said memory area comprising a computer-readable medium having stored thereon a data structure representing the global video format, said data structure comprising:
    a video media type attribute storing a value identifying video media rating information;
    a video media creation attribute storing a value identifying video media release date information;
    a video media title attribute storing a value identifying video media title information; and
    a video media duration attribute storing a value identifying video media run length information, said video media type, creation, title, and duration attributes defining a global video format having a particular format for standardizing video media metadata organization.

10. The method of claim 9 wherein said data structure of said storing operation further comprises at least one of a video media cast attribute storing a value identifying video media actor information, a video media credit attribute storing a value identifying video media director information, a video media creation attribute storing a value identifying video media writer information, and a video media support attribute storing a value identifying video media producer information.

11. The method as set forth in claim 1 further comprising storing the validated metadata in a data store.

12. The method as set forth in claim 11 further comprising accessing said data store and retrieving said validated metadata from said data store.

13. The method as set forth in claim 1 further comprising receiving a request for metadata associated with the video media; and
    providing the validated metadata in response to the request.

14. The method as set forth in claim 1 wherein one or more computer-readable media have computer-executable instructions for performing the method of claim 1.

15. A system for validating the format of metadata relating to video media, said system comprising:
- a processor configured for receiving metadata from a content provider, said metadata being associated with video media and including information describing content of said video media, said received metadata being formatted according to a formatting scheme associated with the content provider; and
- a memory area for storing a global video format schema for organizing metadata relating to video media, wherein said processor is configured to execute computer-executable instructions to determine whether the formatting scheme of the received metadata corresponds to the global video format and to validate the formatting scheme of the received metadata as a function of said determining.

16. The system of claim 15 wherein the memory area comprises a computer-readable medium having stored thereon a data structure representing the global video format, said data structure comprising:
- a video media type attribute storing a value identifying video media rating information;
- a video media creation attribute storing a value identifying video media release date information;
- a video media title attribute storing a value identifying video media title information; and
- a video media duration attribute storing a value identifying video media run length information, said video media type, creation, title, and duration attributes defining a global video format having a particular format for standardizing video media metadata organization.

17. The system of claim 16 wherein said data structure further comprises at least one of a video media cast attribute storing a value identifying video media actor information, a video media credit attribute storing a value identifying video media director information, a video media creation attribute storing a value identifying video media writer information, and a video media support attribute storing a value identifying video media producer information.

18. The system of claim 15 wherein said processor is further configured to execute computer-executable instructions to convert the format of the received metadata from the formatting scheme to the global video format if the formatting scheme of the received metadata does not correspond to the global video format.

19. A computer-readable medium having stored thereon a data structure for generating metadata according to a global video format, said metadata describing content of video media, said data structure having a plurality of pre-defined attributes, said attributes comprising:
- a video media type attribute storing a value identifying video media rating information;
- a video media creation attribute storing a value identifying video media release date information;
- a video media title attribute storing a value identifying video media title information; and
- a video media duration attribute storing a value identifying video media run length information, said video media type, creation, title, and duration attributes defining a global video format having a particular format for standardizing video media metadata organization of metadata received from a plurality of content providers, wherein metadata is received from a content provider, said received metadata being formatted according to a formatting scheme associated with the content provider, wherein the formatting scheme of the received metadata is validated against the video media type, creation, title, and duration attributes of the global video format.

20. The computer-readable medium of claim 19 further comprising at least one of a video media cast attribute storing a value identifying video actor information, a video media credit attribute storing a value identifying video director information, a video media creation attribute storing a value identifying video media writer information, and a video media support attribute storing a value identifying video media producer information.

* * * * *